(12) United States Patent
Zha

(10) Patent No.: US 6,965,006 B2
(45) Date of Patent: Nov. 15, 2005

(54) METAL ALKOXIDE POLYMERS

(75) Inventor: Congji Zha, Holt (AU)

(73) Assignee: rpo Pty Ltd., Eveleigh (AU)

( * ) Notice: Subject to any disclaimer, the term of this patent is extended or adjusted under 35 U.S.C. 154(b) by 462 days.

(21) Appl. No.: 10/119,306

(22) Filed: Apr. 10, 2002

(65) Prior Publication Data

US 2003/0195321 A1 Oct. 16, 2003

(51) Int. Cl.$^7$ ............................................. C08G 77/08
(52) U.S. Cl. ........................... 528/12; 528/10; 528/39; 528/14; 528/9; 528/395; 528/425; 423/325; 423/608; 423/618; 423/626; 423/625
(58) Field of Search ............................... 528/39, 10, 12, 528/14, 9, 695, 425; 423/325, 608, 618, 626, 423/625

(56) References Cited

U.S. PATENT DOCUMENTS

| | | | | |
|---|---|---|---|---|
| 2,486,992 A | * | 11/1949 | Sowa | 556/463 |
| 2,490,691 A | * | 12/1949 | Langkammerer | 556/442 |
| 4,950,779 A | * | 8/1990 | Wengrovius et al. | 556/457 |
| 5,210,168 A | * | 5/1993 | Bergstrom et al. | 528/12 |
| 5,282,918 A | | 2/1994 | Heist | |
| 5,386,007 A | | 1/1995 | Herzig et al. | |
| 5,441,718 A | * | 8/1995 | Sharp | 423/338 |
| 6,133,466 A | | 10/2000 | Edelmann et al. | |
| 6,800,724 B2 | * | 10/2004 | Zha et al. | 528/425 |

FOREIGN PATENT DOCUMENTS

| | | |
|---|---|---|
| EP | 0 652 245 B1 | 5/1995 |
| JP | 63210839 | 9/1988 |
| JP | 1163277 | 6/1989 |
| JP | 6256519 | 9/1994 |
| JP | 7138371 | 5/1995 |
| JP | 7165921 | 6/1995 |
| JP | 7224169 | 8/1995 |
| JP | 8092374 | 4/1996 |
| JP | 11349815 | 12/1999 |
| WO | WO 97/17144 | 5/1997 |

OTHER PUBLICATIONS

"Silicon Compounds (Silicones)", Kirk-Othmer: Encyclopedia of Chemical Technology, vol. 20, 1982 (p. 943).*

* cited by examiner

*Primary Examiner*—Margaret G. Moore
(74) *Attorney, Agent, or Firm*—Miles & Stockbridge P.C.; Edward J. Kondracki

(57) ABSTRACT

A method of synthesizing metal alkoxide polymers is provided, for use, as an example, in synthesizing hybrid organic/inorganic materials with low optical absorption for optical applications. The method involves a plurality of acidolysis steps involving acidolysis of a metal alkoxide compound with an acid to produce an intermediate acidolysed solution, and combining and condensing the intermediate acidolysed solutions to produce the metal alkoxide polymer.

27 Claims, No Drawings

METAL ALKOXIDE POLYMERS

FIELD OF THE INVENTION

The present invention relates generally to a method of synthesising metal alkoxide polymers and relates particularly, though not exclusively, to a method for synthesising hybrid organic/inorganic materials with low optical absorption for optical applications. The invention further relates to the use of these materials for the production of optical waveguides that are used, inter alia, in photonic components for telecommunications networks.

BACKGROUND TO THE INVENTION

Hybrid organic/inorganic materials, in particular siloxane polymers, are excellent candidates for optical materials, in particular for waveguide applications. These hybrid materials share many of the benefits of polymers including rapid material deposition, low processing temperature and amenability to photolithographic waveguide definition, while the silicate backbone increases the hardness and dilutes the hydrocarbon content. This dilution of the hydrocarbon content is important because overtones from C—H vibrations cause optical absorption around the 1.3 and 1.55 µm communications bands.

One potential problem with siloxane polymers is O—H bonds, which also have overtone absorptions around the communications bands and particularly affect the 1.55 µm band. O—H bonds are a particular problem if the siloxane polymers are produced by the known sol-gel process, and the condensation stage is incomplete. In general, the sol-gel process consists of two stages, namely hydrolysis followed by condensation. Water is used to hydrolyse one or more metal alkoxides to produce M—OH groups that condense to form M—O—M linkages, thereby building up a metal oxide network. For example, the liquid methyl triethoxysilane can according to the sol-gel process be hydrolysed:

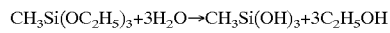

And condensed to produce a methyl-substituted silicate:

The CH$_3$-alkyl substituent is unaffected by the hydrolysis and condensation stages. It will be appreciated that as condensation proceeds, the silicate network becomes increasingly entangled, thereby hindering further condensation reactions, resulting in residual SiOH groups that cause absorption. It is also difficult to completely remove the water from the final product, resulting in additional O—H absorption. These problems have resulted in the development of siloxane polymers for optical waveguide applications with various methods for minimising the O—H content. In one example in an aqueous sol-gel system the O—H content is reduced by incorporating a fluorosilane component and using processing methods that encourage condensation. In another example, a non-aqueous method is used to directly condense silanol and alkoxysilane species and since this method does not involve a hydrolysis stage it is not strictly a sol-gel process.

SUMMARY OF THE INVENTION

According to one aspect of the invention there is provided a method of synthesising a metal alkoxide polymer, said method comprising the steps of:

a plurality of acidolysis steps each involving acidolysis of a metal alkoxide compound with an acid to produce an intermediate acidolysed solution; and combining said intermediate acidolysed solutions which condense to produce the metal alkoxide polymer.

Preferably the method further involves the addition of a condensation catalyst to the combined intermediate acidolysed solutions to assist in the condensation. More preferably the condensation catalyst includes an alkaline solution.

Preferably the method also involves the addition of a neutralisation agent to the condensed intermediate solutions to at least partly neutralise the alkaline solution. More preferably the neutralisation agent includes a further acid.

Preferably the acidolysis and/or condensation steps are performed without addition of water, except when the neutralisation agent is added.

Preferably the plurality of acidolysis steps involves two (2) acidolysis steps.

Preferably the metal alkoxide compound in any one of the acidolysis steps is one of a plurality of metal alkoxide compounds.

Preferably the metal alkoxide compounds are organically modified. More preferably at least 25% of the metal alkoxide compounds are organically modified.

It is to be understood that for the purpose of this specification, an organically modified metal alkoxide compound includes at least one metal to carbon bond that is unaffected during acidolysis and condensation steps.

According to another aspect of the invention there is provided a metal alkoxide polymer being synthesised from a plurality of acidolysis steps each involving acidolysis of a metal alkoxide compound with an acid to produce an intermediate acidolysed solution and combining the intermediate acidolysed solutions which are condensed to produce the metal alkoxide polymer.

Preferably the acidolysis and/or condensation steps are performed without addition of water.

Preferably the metal alkoxide compound(s) have the general formula $R^1{}_nM(OR)_{v-n}$, where: M is a metal of valence V, n is an integer from 0 to (V–1); R is a short chain alkyl group with 1 to 6 carbon atoms; and $R^1$ is an alkyl or aryl group containing from 1 to 20 carbon atoms. The alkyl or aryl group $R^1$ may have substituents including species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups.

If more than one $R^1$ group is present, the $R^1$ groups may or may not be identical. Preferably at least one of the metal alkoxide compounds should have n greater than zero, that is have at least one M—C bond, and said compounds should make up at least 25% of the total number of metal alkoxide species.

Preferably the metal alkoxide compound(s) are alkoxides of silicon, zirconium, titanium, germanium and/or aluminium.

Preferably the acids are inorganic acids such as boric or phosphoric acid and/or carboxylic acids such as formic, acetic or oxalic acid. More preferably the acids are of elements having a glass forming or glass modifying oxide, and have a pKa greater than about 2.

Preferably the molar ratio of the acid to the metal alkoxide compound in each of the acidolysis steps is from 1:5 to 10:1.

Preferably the acidolysis of the metal alkoxide compounds in each of the acidolysis steps is performed in the presence of a mutual solvent. More preferably the mutual solvent is an alcohol such as methanol.

Preferably each of the acidolysis steps and/or the condensation step is conducted for at least 10 minutes at a temperature of greater than 0° C. More preferably each of said steps is carried out at room temperature for up to 24 hours. Even more preferably each of said steps is carried out at a temperature of less than or equal to the boiling point of the mutual solvent.

Preferably the molar ratios of the metal alkoxide compound in one of said plurality of acidolysis steps to the metal alkoxide compound in another of said steps are from 1:10 to 10:1. More preferably said molar ratios are about 1:1.

The acidolysis steps and the condensation step may be performed repeatedly.

Preferably the method further involves acidolysis of another metal alkoxide compound with another acid to produce another intermediate acidolysed solution, and thereafter combining said acidolysed solution with the metal alkoxide polymer.

Preferably the metal alkoxide polymer is a resin.

According to a further aspect of the invention there is provided a method of synthesising a metal alkoxide polymer, the method comprising the steps of:

acidolysis of a metal alkoxide compound with an acid to produce an intermediate acidolysed solution;

condensation of the intermediate acidolysed solution; and further acidolysis of the condensed intermediate solution by the addition of an acid and thereafter production of the metal alkoxide polymer.

Preferably the acid used in each of the acidolysis steps is the same. Alternatively different acids are used in the respective acidolysis steps.

Preferably the condensation step is performed in the presence of another metal alkoxide compound.

Preferably the method further involves the addition of a condensation catalyst to the intermediate acidolysed solution to assist in the condensation. More preferably the condensation catalyst includes an alkaline solution.

Preferably the method also involves the addition of a neutralisation agent to the condensed intermediate solution to at least partly neutralise the alkaline solution. More preferably the neutralisation agent includes a further acid.

According to yet another aspect of the invention there is provided a metal alkoxide polymer being synthesised by acidolysis of a metal alkoxide compound with an acid to produce an intermediate acidolysed solution which is thereafter condensed and further acidolysed by the addition of an acid to produce the metal alkoxide polymer.

Preferably the acidolysis and/or condensation steps are performed without addition of water, except when the neutralisation agent is added.

Preferably the metal alkoxide compound has the general formula $R^1{}_nM(OR)_{v-n}$, where: M is a metal of valence V, n is an integer from 0 to (V-1); R is a short chain alkyl group with 1 to 6 carbon atoms; and $R^1$ is an alkyl or aryl group containing from 1 to 20 carbon atoms.

Preferably the alkyl or aryl group $R^1$ has substituents including species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups.

Preferably the metal alkoxide compound is an alkoxide of silicon, zirconium, germanium and/or aluminium.

According to yet a further aspect of the invention there is provided an optical component including a metal alkoxide polymer as disclosed in the preceding paragraphs. Preferably the optical component is a planar waveguide, optical fibre, integrated device or micro-optic device.

DETAILED DESCRIPTION OF THE PREFERRED EMBODIMENTS

In order to achieve a better understanding of the nature of the invention, preferred embodiments of the method of synthesising a metal alkoxide polymer will now be described in some detail with reference to various illustrative examples.

The described embodiments of one aspect of the method involve the following general steps:

(i) a plurality of acidolysis steps each yielding an intermediate acidolysed solution; and (ii) a condensation step involving combining of the acidolysed solutions.

Acidolysis Steps

These steps are each preferably performed without addition of water, in the presence of a mutual solvent that can be readily removed by evaporation, such as methanol or acetone.

The metal alkoxide compounds used in each of the acidolysis steps typically have the general formula $R^1{}_nM(OR)_{v-n}$, where: M is a metal of valence V, preferably silicon, zirconium, titanium, germanium and aluminium, n is an integer from 0 to (V-1); R is a short chain alkyl group with 1 to 6 carbon atoms; and $R^1$ is an alkyl or aryl group with optional substituents and containing from 1 to 20 carbon atoms. The optional substituents include species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups. If more than one $R^1$ group is present, they may or may not be identical. Unsubstituted alkyl or aryl groups, such as methyl and phenyl groups, are useful for adjusting the refractive index of the material. At least 25% of the total number of metal alkoxide species should have n greater than zero.

The acid used in each of the acidolysis steps may be the same or different and is generally a weak acid selected from a range of inorganic acids (e.g. boric or phosphoric acid) or carboxylic acids (e.g. formic, acetic or oxalic acid), and preferably the acid has a $pK_a>2$. Inorganic acids are preferred if an alcohol is used as the solvent for this step, since carboxylic acids undergo esterification reactions with alcohols, with concomitant production of water. Inorganic acids of elements that form oxides that are glass formers or glass modifiers (e.g. $B_2O_3$ and $P_2O_5$) are further preferred because they can be at least partly incorporated into the hybrid organic/inorganic product material, diluting the organic content and thereby increasing its hardness and decreasing the C—H overtone absorption. Boric acid is particularly preferred since at the end of each acidolysis step, boron-containing species that have not become incorporated into the material (e.g. boric acid and boron alkoxides) are readily removed along with solvent during evaporation. The molar ratio of acid to metal alkoxide species is preferably between 1:5 and 10:1. By way of example, the acidolysis of a metal alkoxide compound with boric acid can be represented as:

$$R^1{}_nM(OR)_{V-n}+(V-n)/3B(OH)_3 \rightarrow R^1{}_nM(OH)_{V-n}+(V-n)/3B(OR)_3$$

After the metal alkoxide and weak acid species in each of the acidolysis steps have been dissolved in the mutual solvent, the mixture is allowed to react for at least 10 minutes, at a temperature between 0° C. and the boiling point of the solvent. Preferably, the acidolysis steps are carried out at a temperature between room temperature and 50° C. for up to 24 hours. The solvent and any volatile products or excess acid catalyst may be removed by evaporation under reduced pressure at the completion of each acidolysis step, to leave a viscous liquid or glassy solid. Thus, the plurality of acidolysis steps each provide respective intermediate acidolysed solutions.

Condensation Step

The intermediate acidolysed solutions are combined and in this example a condensation catalyst in the form of an alkaline solution added to assist the condensation process. The mixture is refluxed for around 1 hour and then volatiles removed by vacuum evaporation. A neutralisation agent in the form of an acid may be added to the condensed solution to neutralise the alkaline catalyst and thereafter the metal alkoxide polymer or resin is produced. The acidolysis steps and the condensation step may be performed sequentially and repeatedly.

Optionally, a small amount of another condensation catalyst can be added before the solvent is evaporated off, to encourage the 2 $\equiv$MOH$\rightarrow$$\equiv$M—O—M$\equiv$+H$_2$O condensation reaction, thereby reducing the OH-related absorption of the product polymers. Many such condensation catalysts, especially for siloxane polymers, will be known to those skilled in the art.

Subsequent Processing

In applications of the invention requiring the deposition of optical quality films (e.g. by spin coating or dip coating), the metal alkoxide polymers can optionally be diluted to the required viscosity with a low volatility solvent, and then filtered to remove particulate matter. Such deposition and filtration techniques and solvents (e.g. propyl acetate, propylene glycol methyl ether acetate and cyclohexanone) are known to those skilled in the art. The metal alkoxide polymers produced according to this embodiment of the present invention have exceptional film forming capability with the spin coating technique, and display excellent adhesion to many substrates including fused silica, silicon and oxidised silicon. Films up to 15 $\mu$m thick, sufficient for the cladding and core layers of singlemode optical waveguides, can be deposited in a single step. After deposition, the films are able to withstand extended periods of baking at temperatures up to 200° C. without cracking or loss of adhesion. After baking, the films have unexpectedly low optical loss owing to their extremely low OH content, and show excellent chemical resistance.

If metal alkoxide compounds with photopolymerisable substituents are employed in this embodiment of the invention, it is advantageous to add a photoinitiator to the metal alkoxide polymer prior to filtration and film deposition. Preferably, the photoinitiator is dissolved in the solvent used to dilute the metal alkoxide polymer to the desired viscosity. Alternatively, if the chosen photoinitiator is soluble in the metal alkoxide polymer, no solvent may be required. One suitable photoinitiator is 2,2-dimethoxy-2-phenylacetophenone (BDK), but several other suitable photoinitiators will be known to those skilled in the art, depending on the application and the available light source. The photoinitiator is typically included in amounts less than 10 mole % with respect to the photopolymerisable substituent, and preferably less than 5 mole %. It is also preferred that any solvent evaporation steps be performed under reduced pressure, at as low a temperature as possible, to limit any thermally-induced polymerisation of the substituents.

EXAMPLE 1

UV Curable Core Material 0.161 mole boric acid and 0.161 mole 3-(trimethoxysilyl) propyl methacrylate (MPS) were dissolved in 50 ml methanol and stirred at room temperature for 12 hours, then volatiles were removed by vacuum evaporation (400 mbar) at 90° C. for 30 minutes. A further 50 ml methanol was added and the vacuum evaporation procedure repeated, to yield a viscous intermediate acidolysed solution A. 0.161 mole boric acid and 0.161 mole diphenyl dimethoxysilane (DPhDMS) were likewise dissolved in 50 ml methanol and treated in the same manner, to yield an intermediate acidolysed solution B. The intermediate acidolysed solutions A and B were mixed together, and a solution of KOH in methanol was added, at a level of 0.1 wt % with respect to the combined metal alkoxide compounds to assist the condensation process. In this example 1.2 ml of the KOH/methanol solution (1 g/15 ml) was used. The mixture was then refluxed for 60 minutes, and volatiles removed by vacuum evaporation (90° C. and 400 mbar for 1 hour) to produce a resin with optical absorption of 0.8 dB/cm at 1550 nm and 0.2 dB/cm at 1310 nm. After addition of 2 wt % of the photoinitiator Irgacure 1000, the resin was filtered to 0.2 $\mu$m and spin coated onto silicon to produce a film that can be patterned with UV light. After baking at 170° C. in vacuum for 3 hours, the film had a refractive index of 1.5550 at 633 nm and optical absorption of 100 dB/cm at 2760 nm, corresponding to an approximate OH concentration of 1000 ppm by weight.

EXAMPLE 2

UV Curable Cladding Material 0.107 mole boric acid and 0.161 mole 3-(trimethoxysilyl) propyl methacrylate (MPS, that is 2/3:1 molar ratio) were dissolved in 35 ml methanol and stirred at room temperature for 12 hours, then volatiles were removed by vacuum evaporation (400 mbar) at 90° C. for 30 minutes. A further 35 ml methanol was added and the vacuum evaporation procedure repeated, to yield a viscous intermediate acidolysed solution C. 0.107 mole boric acid and 0.161 mole phenyl trimethoxysilane (PhTMS) were likewise dissolved in 35 ml methanol and treated in the same manner, to yield an intermediate acidolysed solution D. The intermediate acidolysed solutions C and D were mixed together, and a solution of KOH in methanol was added, at a level of 0.1 wt % with respect to the combined metal alkoxide compounds to assist the condensation process. In this example 1.1 ml of the KOH/methanol solution (1 g/15 ml) was used. The mixture was then refluxed for 60 minutes, and volatiles removed by vacuum operation (90° C. and 400 mbar for 1 hour) to produce a resin with optical absorption of 0.95 dB/cm at 1550 nm and 0.25 dB/cm at 1310 nm. After addition of 2 wt % of the photoinitiator Irgacure 1000, the resin was filtered to 0.2 $\mu$m and spin coated onto silicon to produce a film that can be patterned with UV light. After baking at 170° C. in vacuum for 3 hours, the film had a refractive index of 1.5142 at 633 nm and optical absorption of 130 dB/cm at 2760 nm, corresponding to an approximate OH concentration of 1300 ppm by weight.

EXAMPLE 3

UV Curable Core Material 0.107 mole boric acid and 0.161 mole 3-(trimethoxysilyl) propyl methacrylate were dissolved in 35 ml methanol and stirred at room temperature for 12 hours, then volatiles were removed by vacuum evaporation (90° C., 400 mbar for 30 minutes). A further 35 methanol was added and the vacuum evaporation procedure repeated, to yield a viscous acidolysed solution E. 0.107 mole boric acid, 0.081 mole phenyl trimethoxysilane and 0.81 mole diphenyl dimethoxysilane were likewise dissolved in 35 ml methanol and treated in the same manner, to yield an acidolysed solution F. The acidolysed solutions E and F were mixed together, with 1.1 ml of a KOH/methanol solution (1 g/15 ml) to assist the condensation process. The mixture was then refluxed for 1 hour, and volatiles removed by vacuum evaporation (90° C., 400 mbar for 1 hour) to produce a resin with optical absorption of 0.9 dB/cm at 1550 nm and 0.25 dB/cm at 1310 nm. After addition of 2 wt % of the photoinitiator Irgacure 1000, the resin was filtered to 0.2 µm and spin coated onto silicon, to produce a film that can be patterned with UV light. After baking at 170° C. in vacuum for 3 hours, the film had a refractive index of 1.5350 at 633 nm. The mole ratio of phenyl trimethoxysilane and diphenyl dimethoxysilane used to produce acidolysed solution F can be varied, to produce films with refractive index ranging from 1.5550 (as in Example 1) to 1.5142 (as in Example 2).

In an alternative aspect of the method the following general steps are involved:
i) an acidolysis step with a metal alkoxide compound and an acid;
ii) a condensation step; and
iii) a further acidolysis step without a metal alkoxide compound but with an acid only.

EXAMPLE 4

UV Curable Core Material 0.1 mole boric acid, 0.1 mole phenyl triethoxysilane and 0.1 mole diphenyl dimethoxysilane were dissolved in 30 ml methanol and stirred at 40° C. for 16 hours. 0.16 mole 3-(trimethoxysilyl) propyl methacrylate was added, with 1.3 ml of a KOH/methanol solution (1 g/15 ml) to assist the condensation process, and the mixture refluxed for 1 hour. After cooling to room temperature, a further 0.067 mole boric acid was added and the mixture stirred at 40° C. for 16 hours. The mixture was refluxed for one hour, then volatiles were removed by vacuum evaporation (90° C., 400 mbar for 1 hour). 1.4 ml of an HCl/methanol solution (3 g of 37 wt % aqueous HCl/20 ml methanol) was added to neutralise the KOH, and volatiles removed under high vacuum (room temperature, 6 mbar for 1 hour) to produce a resin with an optical absorption of 0.5 dB/cm at 1550 nm and 0.2 dB/cm at 1310 nm. After addition of 2 wt % of the photoinitiator Irgacure 1000, the resin was filtered to 0.2 µm and spin coated onto silicon, to produce a film that can be patterned with UV light. After baking at 170° C. in vacuum for 3 hours, the film had a refractive index of 1.5266 at 633 nm.

In these examples the methacryl substituents introduced via the MPS confer UV sensitivity. The boric acid serves to initiate the reaction by acidolysing the metal alkoxide compound(s), and most of the boric acid is removed in the vacuum evaporation. Some of the boric acid is incorporated into the silicate network, presumably as $\equiv$Si—O—B$=$ linkages. This feature of the boric acid is believed to be related to the superior hardness and toughness of the material compared with most other hybrid organic/inorganic silicate materials.

The metal alkoxide polymers described above can be used to make optical waveguides for photonic components for telecommunications networks. Such optical waveguides are preferably made by depositing at least one layer (the core), or preferably three layers of the metal alkoxide polymers. As will be known to those skilled in the art, the middle layer, known as the core layer, has a higher refractive index than the other layers, known as the cladding layers. The two cladding layers need not have the same composition, but preferably they should have the same refractive index as each other so that the waveguiding structure, and hence the guided optical mode, is symmetric. Preferably the three layers are supported on a planar substrate, such as a silicon wafer (which may or may not have a surface layer of silicon dioxide) or a rigid polymer. In an alternative embodiment, a silicon dioxide layer can serve as one of the cladding layers.

Preferably, each of the three layers is deposited by spin coating, although other techniques such as dip coating are possible.

Preferably, the core layer material is sensitive to energetic radiation so that waveguides can be patterned into it. More preferably, the core layer material is sensitive to ultraviolet (UV) light, so that the waveguide patterning can be performed with a spatially selective source of UV light such as a mask aligner or a UV laser direct write system. More preferably, the core layer material contains unsaturated carbon-carbon bonds that can be cross-linked by means of a UV-sensitive photoinitiator added to the metal alkoxide polymer used to form the core layer material. More preferably, the cross-linked material has a much lower solubility than the un-cross-linked material, so that the waveguides can be "developed" by dissolving the un-cross-linked material with a solvent.

Preferably, the cladding layer material is similarly sensitive to energetic radiation, so that its hardness can be increased by exposure to said energetic radiation.

By integrating said waveguides with components such as electrodes for heating or applying an electric field, and/or by design of said waveguides, photonic devices wherein light guided in the waveguides is switched, modulated, or otherwise affected in a controlled fashion, can be fabricated. These photonic devices may be useful in photonic communications networks.

Numerous variations and modifications to the described method and resultant metal alkoxide polymers will suggest themselves to persons skilled in the art in addition to those described. For example, the refractive index of the metal alkoxide polymers can be adjusted by varying the ratio of MPS to PhTMS or MPS to DPhDMS. The optical properties of the polymer product may also be adjusted by using alkoxides of other metals, such as zirconium, titanium, germanium or aluminium. The described embodiments of the invention provide a method to synthesise materials with a wide range of compositions, hardness, low optical absorption and low shrinkage. In addition to the applications described in the Examples above, the metal alkoxide polymers can be used for moulding micro-optic components (e.g. lenses) or as an optical glue or an encapsulent for device packaging, for a range of optical applications including but not limited to photonics.

All such variations and modifications are to be considered within the scope of the present invention, the nature of which is to be determined from the foregoing description.

What is claimed is:

1. A method of synthesising a metal alkoxide polymer, the method comprising the steps of:
   a plurality of acidolysis steps each involving
   acidolysis of a metal alkoxide compound with an acid to produce an intermediate acidolysed solution;
   combining said intermediate acidolysed solutions which condense to produce the metal alkoxide polymer;
   adding a condensation catalyst to the combined intermediate acidolysed solutions to assist in the condensation, the condensation catalyst including an alkaline solution; and
   adding a neutralization agent to the condensed intermediate solutions to at least partly neutralize the alkaline solution.

2. A method of synthesising a metal alkoxide polymer as defined in claim 1 wherein the neutralisation agent includes a further acid.

3. A method of synthesising a metal alkoxide polymer as defined in claim 1 wherein the acidolysis and/or condensation steps are performed without addition of water.

4. A method of synthesising a metal alkoxide polymer as defined in claim 1 wherein said plurality of acidolysis steps involves two (2) acidolysis steps.

5. A method of synthesising a metal alkoxide polymer as defined in claim 1 wherein the metal alkoxide compound in any one of the acidolysis steps is one of a plurality of metal alkoxide compounds.

6. A method of synthesising a metal alkoxide polymer as defined in claim 1 wherein the metal alkoxide compounds are organically modified.

7. A method of synthesising a metal alkoxide polymer as defined in claim 6 wherein at least 25% of the metal alkoxide compounds are organically modified.

8. A method of synthesising a metal alkoxide polymer as defined in claim 1 wherein the metal alkoxide compounds have the general formula $R^1{}_n M(OR)_{v-n}$, where: M is a metal of valence V, n is an integer from 0 to (V−1); R is a short chain alkyl group with 1 to 6 carbon atoms; and $R^1$ is an alkyl or aryl group containing from 1 to 20 carbon atoms.

9. A method of synthesising a metal alkoxide polymer as defined in claim 8 wherein the alkyl or aryl group $R^1$ has substituents including species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups.

10. A method of synthesizing a metal alkoxide polymer as defined in claim 1 wherein the metal alkoxide compounds are alkoxides of silicon, zirconium, titanium, germanium and/or aluminium.

11. A method of synthesizing a metal alkoxide polymer as defined in claim 1 wherein the acids are inorganic acids such as boric or phosphoric acid and/or carboxylic acids such as formic, acetic or oxalic acid.

12. A method of synthesizing a metal alkoxide polymer as defined in claim 11 wherein the acids are of elements having a glass forming or glass modifying oxide, and have a pKa greater than 2.

13. A method of synthesizing a metal alkoxide polymer as defined in claim 1 wherein the molar ratio of the acid to the metal alkoxide compound in each of the acidolysis steps is from 1:5 to 10:1.

14. A method of synthesizing a metal alkoxide polymer as defined in claim 1 wherein each of the acidolysis steps and/or the condensation step is conducted for at least 10 minutes at a temperature of greater than 0° C.

15. A method of synthesizing a metal alkoxide polymer as defined in claim 1 wherein each of the acidolysis steps is carried out at a temperature between room temperature and 50° C. for 1 to 24 hours.

16. A method of synthesising a metal alkoxide polymer as defined in claim 1 wherein each of the acidolysis steps and/or the condensation step is carried out at room temperature for 1 to 24 hours.

17. A method of synthesising a metal alkoxide polymer as defined in claim 1 wherein the acidolysis of the metal alkoxide compounds in each of the acidolysis steps and/or the condensation step is performed in the presence of a mutual solvent.

18. A method of synthesising a metal alkoxide polymer as defined in claim 17 wherein the condensation step is carried out at a temperature less than or equal to the boiling point of the mutual solvent for 10 to 120 minutes.

19. A method of synthesising a metal alkoxide polymer as defined in claim 17 wherein the condensation step is carried out at the boiling point of the mutual solvent for 60 minutes.

20. A method of synthesising a metal alkoxide polymer as defined in claim 1 wherein the molar ratios of the metal alkoxide compound in one of said plurality of acidolysis steps to the metal alkoxide compound in another of said steps are from 1:10 to 10:1.

21. A method of synthesising a metal alkoxide polymer as defined in claim 20 wherein said molar ratio is about 1:1.

22. A method of synthesising a metal alkoxide polymer as defined in claim 1 wherein the acidolysis steps and the condensation step are performed repeatedly.

23. A method of synthesising a metal alkoxide polymer as defined in claim 1 involving the further acidolysis of a metal alkoxide compound with an acid to produce another intermediate acidolysed solution, and thereafter combining said acidolysed solution with the metal alkoxide polymer.

24. A method of synthesising a metal alkoxide polymer, the method comprising the steps of:
   acidolysis of a metal alkoxide compound with an acid to produce an intermediate acidolysed solution;
   condensation of the intermediate acidolysed solution;
   further acidolysis of the condensed intermediate solution by the addition of an acid to produce the metal alkoxide compound;
   adding a condensation catalyst to the intermediate acidolysed solution to assist in the condensation, the condensation catalyst including an alkaline solution; and
   adding a neutralization agent to the condensed intermediate solution to at least partly neutralize the alkaline solution.

25. A method of synthesising a metal alkoxide polymer as defined in claim 24 wherein the condensation of the intermediate acidolysed solution is performed in the presence of another metal alkoxide compound.

26. A method of synthesising a metal alkoxide polymer as defined in claim 24 wherein the neutralisation agent includes a further acid.

27. A method of synthesising a metal alkoxide polymer as defined in claim 24 wherein the acidolysis and/or condensation steps are performed without addition of water.

* * * * *